July 11, 1967    J. W. ROWE    3,330,712
PROCESS FOR THE TRANSFER OF PRINTED IMAGES TO
THERMOSETTING RESIN SURFACES
Filed April 15, 1963    2 Sheets-Sheet 1

INVENTOR.
JAMES W. ROWE
BY Joseph A. Hill
ATTORNEY

United States Patent Office 3,330,712
Patented July 11, 1967

3,330,712
PROCESS FOR THE TRANSFER OF PRINTED IMAGES TO THERMOSETTING RESIN SURFACES
James W. Rowe, 600 Dean Drive,
Rockville, Md. 20851
Filed Apr. 15, 1963, Ser. No. 273,250
7 Claims. (Cl. 156—240)

ABSTRACT OF THE DISCLOSURE

The present invention relates to the transfer of ink or dye printed images on and into thermosetting resin surfaces. Thermosetting resins, in contrast with thermoplastic resins, are converted by a curing agent, and, upon setting, become hard and infusible. They have in common a system of linkages in a network of cross linkages in three dimensions, in contrast to the permanently fusible thermoplastic resins composed of long linear chains lying together in three dimensions but not interconnected as, for example, polyethylene and polyvinyl chloride.

---

The invention described herein may be manufactured and used by or for the Government for governmental purposes without the payment to me of any royalty thereon.

Cross-references to related applications

This application is a continuation-in-part of my application, Ser. No. 87,046, filed Feb. 3, 1961.

Background of the invention (1) *Field of the invention.*—This invention relates particularly to the transfer of images onto polyester resin surfaces.

(2) *Description of the prior art.*—Previously developed transfer methods have required the preparation of a transfer on a temporary supporting material such as paper which must be soaked in water prior to removal of the transfer or the preparation of a permanent transfer layer and a decorative layer in such a manner as both are applied to the object to which the transfer is made, or, in the case of plastics a bearer of fibrous material upon which the printed matter has been impressed, the transfer taking place by the absorption of the fibers into the plastic, or, again in the case of plastics, the use of a thermoplastic ink which penetrates into a plastic surface under conditions of extreme heat.

An epoxy resin, otherwise described as a glycidyl ether of polyhydric phenols, such as that formed as a reaction product of epichlorohydrin and bisphenol A in the presence of a strong caustic such as sodium hydroxide, when catalyzed with an amine-type hardener, has a strong affinity for a wide variety of materials, including vinyl base inks, pigmented bichromated casein inks, and oil soluble dyes. A transfer of printed images can be effected as long as the affinity of the epoxy resin for the inks or dyes is greater than that of the material on which the image is printed. The inks become chemically bonded and thus offer excellent resistance to solvents and good resistance to abrasives. Where dyes are used, the image becomes resistant to solvents and highly resistant to abrasives. The imprinted epoxy surfaces will withstand heat up to 347° F. without affecting the image. These dyes will penetrate the epoxy resin to a depth of approximately 0.002 inch. A property of the epoxy resin is such that during the transfer process its surface assumes the surface characteristics of the material from which the transfer was made. For example, if the surface of the printed material is either glossy or semi-matte, the surface of the epoxy resin will likewise be glossy or semi-matte. Accordingly, my application Ser. No. 87,046 describes a novel process for transfer-printing of epoxy resins from flat or from three-dimension surfaces of various materials. The mechanical process comprises in essence the coating of epoxy resin together with a hardener on a printed sheet and the separation of the printed resin from the sheet.

Summary

A polyester resin, which is basically defined as a polycondensation product of dicarboxylic acids with dihydric alcohols when catalyzed with an organic peroxide or hydroperoxide and activators or accelerators including cobalt naphthenate, alkyl mercaptan, and dialkyl aromatic amines, has a strong affinity for a variety of materials including vinyl base inks and pigmented bichromated casein inks. As in the case of epoxy resin, transfer of printed images can be effected as long as the affinity of the polyester for the inks is greater than that of the material on which the image is printed. These inks, after being transferred to the polyester, become chemically bonded, and thus offer excellent resistance to solvents and good resistance to abrasives.

Previously developed transfer methods have required the preparation of a transfer on a temporary supporting material such as paper which must be soaked in water prior to removal of the transfer or the preparation of a permanent transfer layer and a decorative layer in such a manner as both are applied to the object to which the transfer is made, or, in the case of plastics, a bearer of fibrous material upon which the printed matter has been impressed, the transfer taking place by the absorption of the fibers into the plastic, or, again in the case of plastics, the use of a thermoplastic ink which penetrates into a plastic surface under conditions of extreme heat.

The instant invention enables, in situations where a thermosetting resin surface may be the surface to which the final transfer is made, the direct transfer, without a permanent transfer media, without soaking in water, without extreme heat and pressure, and without the further treatment required of the surface to which the transfer has been made as in the case of the transfer by absorption of fibers from the bearer into the plastic surface.

Brief description of the drawings

Other objects and advantages of the invention will be fully understood from the following description and claims when taken in connection with the accompanying drawings, in which:

In FIG. 1 the thermosetting (epoxy) resin is shown in contact with the printed sheet, which sheet in turn is supported firmly during the transfer process by a vacuum top plate. FIG. 2 shows the removal of the printed sheet and the thermosetting resin with the images imprinted thereon from the vacum top plate and the separation of the formerly printed sheet from the now imprinted thermosetting resin. FIG. 3 shows the finished thermosetting resin with the transferred image therein.

Description of the preferred embodiment

Figure 1:
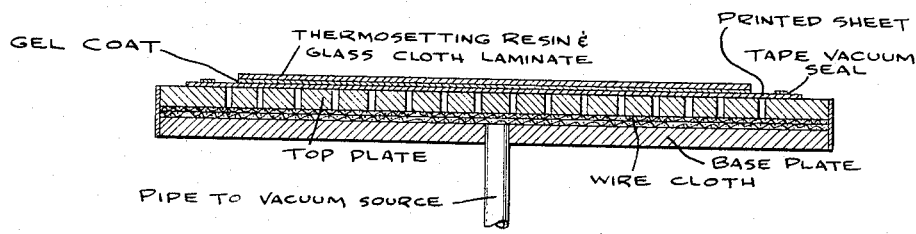
FIGS. 1, 2, and 3 show in cross-section the application of this invention in transferring an image from and to a flat surface.

As stated above, the process depends upon the greater affinity of the inks or dyes comprising the image to be transferred for the thermosetting resin than the affinity of said inks, etc., for the material upon which the image is printed originally. This printed sheet material must also be readily detachable from the cured resin. For epoxy resin, materials satisfying these requirements are paper, vinyl halide polymers including vinyl chloride in rigid, flexible or high impact form, polyethylene, cellulose acetates, cellulose acetate butyrates, and polyesters. Results with polyester coatings or castings differ slightly in that flexible printed sheets, such as vinyl halide and polyethylene, produce less satisfactory results.

Also, as stated above, the image which is the subject of transfer must be printed in a material to which the resin has a strong affinity. These materials including vinyl based inks, pigmented bichromated casein inks, and (with respect to epoxy resin only), oil soluble dyes, are either printed or reverse-printed upon the base material. If the image is reverse printed, the transferred image will be positive. A reverse image is one in which features and characters are reversed, from one side to another, as when the object is viewed in a mirror. Reverse printing is well known in the art of printing and in the art of map making. If the surface to which the transfer is made is to be three-dimensional, the base material upon which the image is printed, must be molded to the form of the three-dimensional model. The molding may be positive or negative depending upon whether a positive or negative image is desired. The choice will, of course, depend upon the nature of the printed matter and of the form to be transferred. Both positive and negative moldings of flat printed sheets are well known in the art of map making.

While the basic epoxy resin described above and more particularly described in Patent No. 2,848,435, issued to Leonard H. Griffin and James H. Long, assignors to Shell Development Company, New York, N.Y. on Aug. 19, 1958, will suffice for this process, it is desirable but not necessary, when applying the transfer process to the embodiments described below, to utilize two separate mixtures; one for the initial application, and another for a strengthening subsequent application to the printed sheet. These mixtures are called: (1) the epoxy gel coat, and (2) the epoxy and glass cloth laminating layer. The use, as well as the proportional amounts of the additives which, together with the basic epoxy resin, comprises the above-described mixtures, may be considerably varied depending upon the nature of the transfer to be made. These additives are not new in the laminating arts and are described and claimed herein only as they apply to the transfer process. Where it is desired that the finished product have fire retardent properties, antimony trioxide, and such chlorine releasing compounds, as polyvinyl chloride, in ground or powdered form, may be utilized. The proportional amount of fire retardent materials is not critical and may be added in unlimited amounts or not at all. Where steep or vertical surfaces are utilized in the transfer process, a filler with thixotropic properties is desirable to prevent drainage particularly immediately after application of the initial gel coat layer. Such a filler as expanded silica has been successfully utilized for this purpose. Here again the proportional amount of the thixotropic agent is not critical. Recommended mixtures are described as preferred embodiments below. The epoxy resin is cured or hardened in a manner known in the laminating arts with the use of such amine-type hardeners as diethylene triamine, triethylene tetramine, and 4,4'-methylene dianiline. The proportionate parts of the aforesaid curing agents, their curing times, and post curing times are as follows:

As is well known to those skilled in the art of laminating procedures, the amount of the curing agent is critical as the epoxy resin will not harden where less than approximately one-half of the above-recommended proportions, or more than approximately ten additional parts by weight for one hundred parts of the unfilled epoxy resin, is utilized at room temperature.

Referring now in detail to FIG. 1, the printed sheet is held firmly in place and in shape by a top plate which is a horizontal sheet of one-half inch thick aluminum through which a plurality of holes has been drilled with a number 60 wire drill. Under the top plate is a double thickness of wire mesh cloth of eight mesh galvanized wire. Supporting the wire mesh in the vacuum top plate is a base plate comprising an imperforate horizontal layer to which a vertically extending pipe is attached, the pipe extending through the vacuum base plate and terminating flush with the upper surface thereof. In order to prevent the entrance of air to the detriment of the vacuum, the side surfaces of the top plate and base plate are covered by an adhesive tape shown on FIG. 1 as a tape vacuum seal. Upon the top of the base plate is placed the printed sheet of vinyl chloride, polyethylene, cellulose acetate, or cellulose acetate butyrate. The image, in this preferred embodiment, is a reverse image, and should be on the side of the printed sheet away from the vacuum top plate. The edges of the printed sheet are secured to the top plate in an airtight manner by the use of adhesive tape or liquid cement. Vacuum is then applied to the printed sheet thereby holding it firmly in place and preventing distortion of the sheet and the image. The vacuum necessary to prevent distortion will, of course, vary according to the thickness and rigidity of the printed sheet, as well as the heat stability of the sheet and the exotherm of the resin. Where the sheet is very flexible or unstable, it is recommended that up to twenty-six inches of vacuum be applied. Where the sheet is very rigid and stable no vacuum is required.

At this point, the printed sheet is ready for the application of the gel coat of epoxy resin. The recommended mixture for the gel coat in this embodiment is as follows:

| | Parts by wt. |
|---|---|
| Epoxy resin | 100 |
| Titanium dioxide | 40 |
| Polyvinyl chloride powder (200 mesh) | 5 |
| Antimony trioxide | 5 |
| Expanded silica | 3 |

The gel coat is prepared according to the following procedure. The resin is placed in a steam-heated, water-cooled, jacketed, blending machine equipped with S (Sigma) type blades. The steam is turned on and the resin is heated to between 200° and 210° F. The blades are then set in motion for about 10–15 minutes during which time the heat within the resin is uniformly distributed. The antimony trioxide and crushed polyvinyl chloride are then added and the mixture is again blended for from 1–2 hours. The titanium dioxide and expanded silica are then added and the blending process is repeated from 2–6 hours. This two stage blending process is of importance in that it assures a uniform distribution of the fire retardent material throughout the resin. Leaving the blender on, the steam heat is turned off and cold water is circulated through the jacket until the resin is

| Curing Agent | Parts (by wgt.) Curing Agent to 100 Parts by wgt. Unfilled Epoxy Resin (Rm. Temp. Hardener) | Room Temp. Cure (25° C), hours | Post Cure to Obtain Max. Strength for Service | |
|---|---|---|---|---|
| | | | Hours | Temp. in ° C. |
| Diethylene Triamine | 10 | 20 | 2 | 100 |
| Triethylene Tetramine | 10–20 | 20 | 2 | 150 |
| 4,4' Methylene Dianiline | 28.5 | 20 | { 2 / 2 | 100 / 130 | cooled to room temperature. When the resin has cooled, the blades are turned off and the mixture should be allowed to set until all air trapped in the resin mixture has been permitted to escape. This may require up to eight hours. Immediately prior to the application of the gel coat to the printed sheet, the curing agent is added and thoroughly mixed. The gel coat may now be applied to the printed sheet by means of a paint brush. The initial coat is applied with a stippling motion in order to eliminate air bubbles entrapped in the material and to obtain a continuous coat of the resin. The initial coat should not exceed one-sixteenth of an inch in thickness. The gel coat is then cured at room temperature until it becomes hard and tack free in consistency. This curing will vary from twenty minutes to one hour.

After the curing of the gel coat, there is applied an epoxy and glass cloth laminating layer. The resin for the laminating layer may be prepared in the manner described above for the gel coat using the following described proportion:

| | Parts by wt. |
|---|---|
| Epoxy resin | 100 |
| Titanium dioxide | 20 |
| Polyvinyl chloride powder (200 mesh) | 5 |
| Antimony trioxide | 5 |

Figure 2:
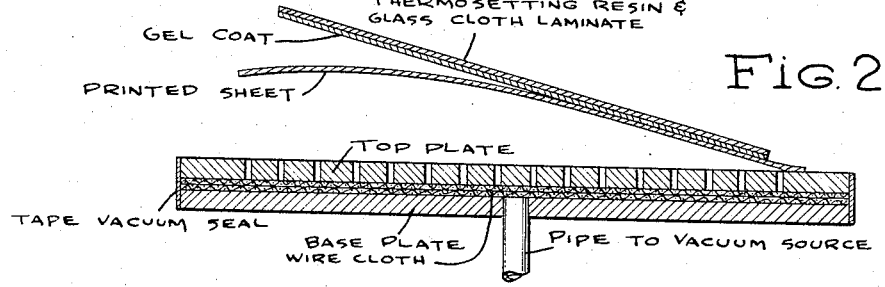
Figure 3:
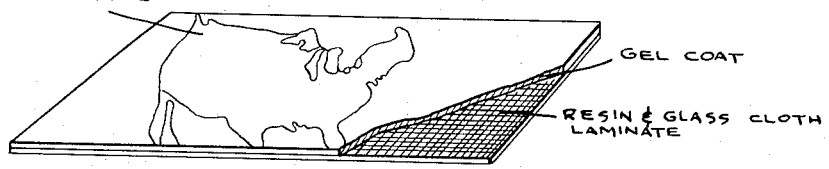

The gel coat is then painted with the laminating resin and a sheet of glass cloth is laid over the wet resin. More liquid resin is then stippled through the glass cloth. This step is repeated until a desired thickness of laminating resin and glass cloth is built up. Eight layers of glass cloth are recommended for a desirable degree of strength. The laminated resin layer requires from two to six hours to harden at room temperature. After hardening, the vacuum is discontinued, the seal is broken, and the epoxy layers together with the printed sheets are removed from the top plate. As shown in FIG. 2 the epoxy body is grasped in one hand and the formerly printed sheet is stripped therefrom by pulling apart with the other hand. FIG. 3 depicts the gel coat layer with the transferred image embedded therein in the form of a map of the United States, together with its laminated backing.

As is explained above polyester resin may be substituted for epoxy resin in a nearly identical process, using for the reverse printed material, polyvinyl chloride and cellulose acetate. To assure that the resin exotherm, while catalyzing, does not warp the printed plastic sheet, where the printed sheet is less than ten one-thousandths inch thick, the vacuum type plate should be used. The catalyzed resin is allowed to gel for from fifteen minutes to two hours depending upon the proportion of the catalyst and accelerator used. If needed for strength, glass fabric or other suitable backing material can be used to build the laminate to the desired thickness. When the resin has hardened, the base material can be stripped from the polyester cast. Stripping is accomplished in the same manner as described above with respect to the epoxy.

Figure 4:
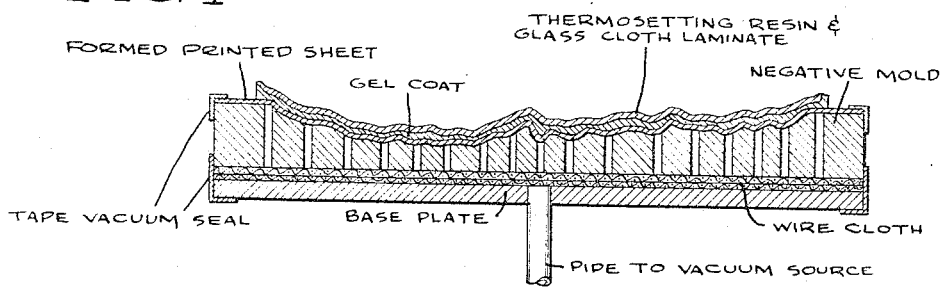
FIGS. 4, 5, and 6 depict the same steps as applied to a three-dimensional surface.
Figure 5:
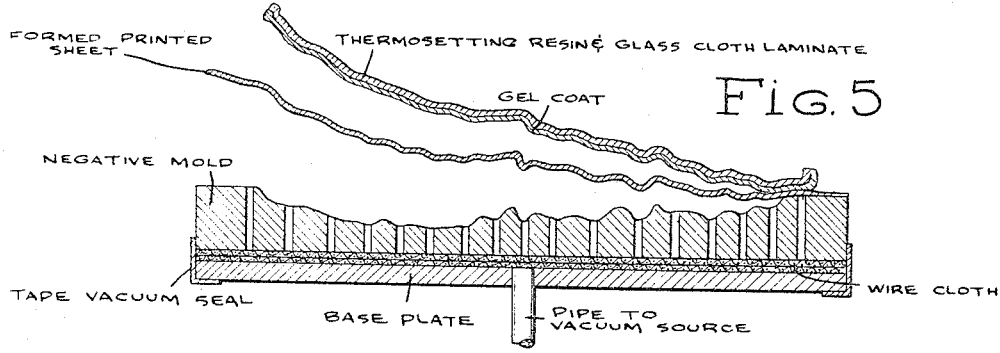
Figure 6:
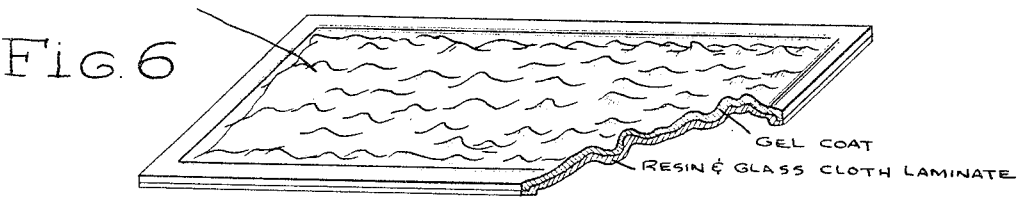

Referring now in detail to the second preferred embodiment, as illustrated in FIGS. 4, 5, and 6, the process being substantially similar to that described above with the first embodiment, is here described in detail only as it differs from the above described process. As the transfer here is to a three-dimension surface, the top plate must be replaced by a negative mold of the desired three-dimension surface made of plaster or a similar material. The mold contains a plurality of vertical air holes as in the vacuum top plate of the flat surface process except that the holes should be drilled in such a manner as to lead to the low points of the negative mold. The printed sheet must also be in the form of a negative mold with the reverse image imprinted on the top side, that is, the side away from the mold. After the gel coat has been applied in the same manner as described above, and allowed to cure, but prior to the application of the glass cloth reinforced layer if a solid flat base to the three-dimension model is desired, it is recommended that a batch of laminating resin, to which has been added enough chopped glass cloth, or flock, while mixing, to obtain a mixture of paste or putty-like consistency, be made. Normally a proportion of three times the volume of chopped glass to one volume of the resin is required to obtain this consistency. This paste-like resin mixture is then troweled carefully into the indentations of the three-dimension model, leveled and smoothed out, and allowed to cure at room temperature for a period of about two hours. This optional leveling layer is not depicted in FIGS. 4–6. The process is then completed, as described above, with the application of the laminating layers.

Again the polyester process is similar, differing only as would be obvious to those skilled in the art who are familiar with the materials used.

Figure 7:
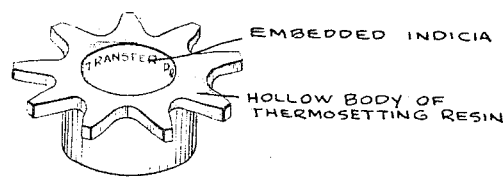
FIG. 7 shows an article with encapsulated printing on an interior surface or space.

The use of polyester resin makes it possible to print images of multi-colors cheaply and easily. It also makes it possible to print on surfaces of odd shapes and three-dimensional surfaces as in the encapsulation shown at FIG. 7 or with electrical parts. This can be done by using pressure sensitive tape which has been reverse printed and placed in the mold cavity before the resin is cast. After the cast is made and set the tape is removed leaving the image on the polyester surface. Polyester may also be used in the printed circuit field where metallic inks or paints are used as the image.

In order to use the polyester resin with flexible chlorides or with rubber molds, as room temperature vulcanizing rubber is used in the mold, the polyester casting must be accelerated with cobalt and methyl ethyl ketone peroxide catalyst, in order to have it set at room temperature in a short time (such as four hours or at little as five minutes). The reaction between the mold and the polyester is, of course, not a transfer problem. Polyester is not as adhesive to the inks as epoxy. The epoxy will take a transfer from a color proof and the strip-off will be easy and clean. With polyester, color proof must be done with water soluble inks such as casein.

Many aspects of the above process touches on or includes material old in the art. Where possible, this has been pointed out in every situation. It should also be noted that the process of build-up of resin laminate even to include the use of the gel coat, is old.

It is obvious that the above-described embodiments are by way of example only and that numerous changes may be made within the purview of this invention. All materials are capable of susceptible of change. Even with respect to the epoxy resin, equivalent substances may be found with properties capable of being adapted to this process.

I claim:

1. A transfer process for three-dimension surfaces comprising the steps of supporting and holding a solid sheet in the form of a negative mold with a negative vacuum mold; the solid sheet being of a material selected from the group consisting of rigid vinyl halide polymers, cellulose acetates, and cellulose acetate butyrates; the solid sheet being printed with the material selected from the group consisting of vinyl based inks and pigmented bichromated casein inks; coating the solid sheet with a polycondensation product of dicarboxylic acid with dihydric alcohols in the presence of a material selected from the group consisting of organic peroxide and hydroperoxide, said coating having a greater affinity for the printing material than for the sheet curing said coating; and physically stripping said coating from said solid sheet.

2. The transfer process of claim 1 wherein the step of coating the printed sheet with said coating material is followed by further coating the sheet with a plurality of alternating layers of glass cloth and said coating material prior to curing said coating.

3. The method of manufacture of hollow bodies having interior surfaces bearing especially tenacious and permanent indicia, said method comprising reverse printing said indicia on a flexible bearer means, said indicia being of material selected from the group consisting of vinyl base inks and pigmented bichromated casein inks, supporting said bearer means on a core, molding said hollow body around said core, the portion of said hollow body contiguous to said bearer means being constituted of a material from the group consisting of a polycondensation product of dicarboxylic acid with dihydric alcohols in the presence of a material selected from the group consisting of organic peroxide and hydroperoxide, removing said core and stripping said bearer means from the molded interior surfaces.

4. A transfer process comprising the steps of:
  (a) printing an informational pattern on a plastic sheet with a printing material, said sheet being selected from the group consisting of rigid vinyl halide polymers, cellulose acetates, and cellulose acetate butyrates, said printing material being selected from the group consisting of vinyl base inks and pigmented bichromated casein inks;
  (b) coating the printed side of said plastic sheet with a polycondensation product of dicarboxylic acid with dihydric alcohols in the presence of a material selected from the group consisting of organic peroxide and hydro peroxide; said coating material having a greater affinity for the printing material than for the sheet;
  (c) curing the coating;
  (d) physically stripping the coating from said plastic sheet.

5. A transfer process as in claim 4 wherein the coating material includes fire retardent materials comprising ground vinyl chloride and antimony trioxide, and a thixotropic agent of expanded silica.

6. The transfer process of claim 4 wherein following the steps of coating said sheet with said resin and curing said resin, said process further comprises the steps of:
  (a) coating the cured resin with a plurality of alternating layers of glass cloth an dof said resin;
  (b) curing the laminated resin;
  (c) physically stripping the cured laminated resin from said sheet.

7. The transfer process of claim 4 further comprising the steps of supporting and holding in shape said plastic sheet on a vacuum plate after said informational pattern is printed thereon for coating said sheet with said coating material.

References Cited

UNITED STATES PATENTS

| | | | |
|---|---|---|---|
| 2,523,234 | 9/1950 | Rado | 156—240 XR |
| 2,558,803 | 7/1951 | Wittgren | 156—240 |
| 2,627,486 | 2/1953 | Smith | 156—240 XR |

EARL M. BERGERT, *Primary Examiner.*

M. L. KATZ, *Examiner.*